Oct. 13, 1953 W. G. CHARLEY 2,655,088
TOOL MOUNTING
Filed July 6, 1949

Inventor
Walter G. Charley
James T. Coffee
Attorney

Patented Oct. 13, 1953

2,655,088

UNITED STATES PATENT OFFICE 2,655,088

TOOL MOUNTING

Walter G. Charley, La Crescent, Minn., assignor to Allis-Chalmers Manufacturing Company, Milwaukee, Wis., a corporation of Delaware Application July 6, 1949, Serial No. 103,298

6 Claims. (Cl. 97—198.1)

This invention relates generally to agricultural implements and is more particularly directed toward means for adjustably attaching individual tools to the carrier bar of a ground rig or to any other suitable part of an agricultural machine.

The invention is of particular utility, but not limited in its application, to the attachment of ground working tools to cultivator frames or the like. Furthermore, the present invention contemplates an attaching means for tools which may be used with a supporting frame structure which is relatively inexpensive to construct, for example a frame made of rectangular metal stock, and avoids the necessity of using a tubular frame construction which is generally heavier, more cumbersome and relatively expensive to form.

During more recent years careful study has been made of row crop cultivation and one result of this study has been the design of a large variety of earth working tools, each suited for a particular type of plant and/or condition of soil. And, consequently, the modern farmer planting a number of different row crops each year usually has a large collection of shovels, hoes and sweeps which he may interchangeably mount on his cultivator frame to meet his changing need. It is desirable, therefore, that the tool attaching means be as simple as possible to permit a quick change of tools with a minimum of effort and, also, that it permit adjustment of the tool relative to the supporting structure to thereby afford the most efficient operating position for the particular tool.

Accordingly, it is a primary object of the present invention to provide a two-bolt tool clamping means which permits adjustable positioning of the tool along a supporting bar and affords angular adjustment of the tool through the loosening of one of the clamping bolts.

Another object of this invention is to provide a tool clamping means employing the use of only two bolts and permitting angular and/or horizontal adjustment relative to the supporting bar, which means does not require bolt receiving openings in the supporting bar.

A still further object of this invention is to provide a two-bolt clamping means for receiving a tool in selectively fixed relation thereto and for adjustably positioning the tool along a supporting bar, which means requires the loosening of only one bolt to further shift the tool vertically, angularly or longitudinally, relative to the bar.

Another object of this invention is to provide a two-bolt clamping means for adjustably fixedly positioning a tool along a supporting bar wherein one of the bolts includes a tool receiving portion and wherein the clamping means may be selectively constructed to permit angular adjustment of the tool relative to the bar about the pivot axis afforded by the tool receiving bolt or about the axis of the other bolt.

And, accordingly, the present invention may be considered as comprising the various constructions and combinations hereinafter more particularly pointed out in the descriptive matter and claims, reference being had to the accompanying drawings, in which:

Figure 1:
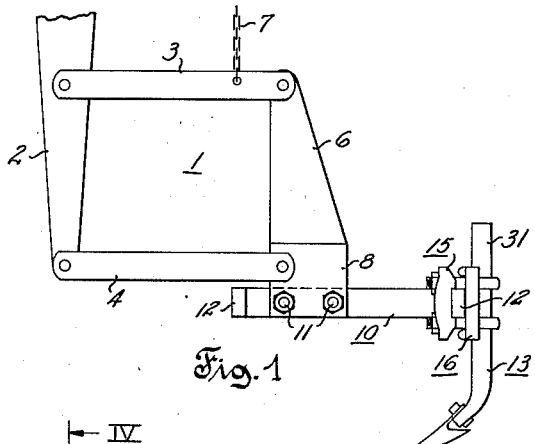
Fig. 1 is a side elevation of a vertically adjustable tool rig embodying the present invention.

Referring to Fig. 1 it will be seen that apparatus chosen to illustrate the present invention is mounted on an implement supporting frame of which only the vertically adjustable linkage 1 is shown in the interest of simplicity, it being understood that this supporting frame may be mounted on a tractor or any other suitable form of traveling vehicle through a conventional attaching means (not shown). Linkage 1 comprises a depending arm 2 provided with vertically spaced pivot mountings supporting the forward ends of rearwardly extending generally parallel links 3 and 4 having rear end portions thereof pivotally connected to an upright member 6. Upper link 3 has suitable connection with a conventional type lift mechanism (not shown), mounted on the traveling vehicle, through a chain or the like 7 and such lift mechanism is operable to adjust the position of linkage 1 relative to the ground.

The lower portion of upright member 6 includes a tool bar receiving element which may be of any suitable construction and is shown as a plate member 8 having a pair of openings therethrough (not shown) alignable with a similar pair of openings (also not shown) in a longitudinally disposed tool bar 10 and secured thereto by bolts 11 or the like. The front and rear end portions 12 of tool bar 10 are bent at approximately a right angle with respect to the main portion of the bar and afford space for selective positioning of tools 13 therealong.

For detachably securing a tool 13 to bar portion 12 (or to the longitudinally disposed portion of bar 10, if desired) in any selected position therealong and in a manner affording vertical and/or angular adjustment of tool 13 relative to the bar, there is provided a clamping device comprising generally a pair of elements 15 and 16 detachably fixed in adjustable position on opposite surface portions of bar 12 by tool receiving eyebolts 17 and 18. More specifically, clamping element or part 15 is positioned in abutting relation to a portion of the leading surface of tool bar portion 12 and is fixed against vertical movement relative to the bar by means of projecting lug portions 20 (see also Fig. 4) which engage opposite edges of the abuttingly engaged surface. It will also be noted that element 15 is of generally oblong configuration with opposite end portions 21 and 22 thereof extending above and below bar 12. The upper end portion 21 is provided with a circular opening 23 therethrough and the lower end portion 22 has an arcuate slot 25 therethrough concentric with opening 23.

Figure 2:
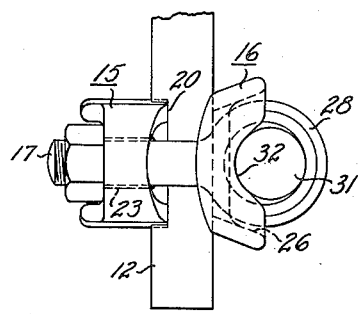
Fig. 2 is an enlarged plan view of the tool mounting shown in Fig. 1.
Figures 3, 4, 5:
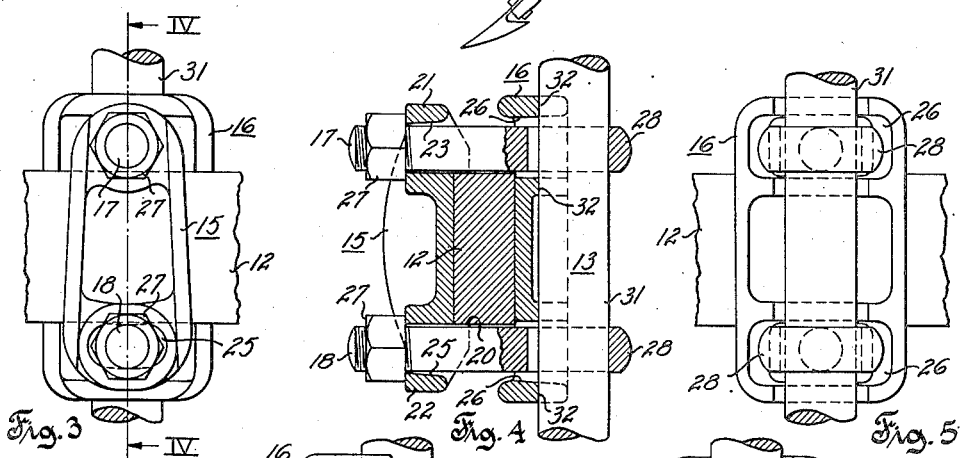
Fig. 3 is a left hand elevation of the structure shown in Fig. 4.
Fig. 4 is a section taken along line IV—IV in Fig. 3.
Fig. 5 is a right hand elevation of the structure shown in Fig. 4.

Clamping element 16 is preferably a generally rectangular flat part with one surface thereof formed to slidably engage the surface of bar 12 in opposed relation to clamping element 15. Opposite end portions of element 16 extend above and below tool bar 12 and have openings 26 therethrough alignable with the corresponding openings in clamping element 15. Openings 26 are formed with a slotted recess so that when eyebolts 17 and 18 are passed through the pairs of aligned openings in the clamping elements, the heads of the eyebolts are vertically aligned and fixed against rotation about the longitudinal axes of the bolts. Nuts 27 are placed on the opposite threaded end portion of each bolt to secure the clamping elements in position. And in this connection it will be noted that the vertically aligned heads or eye portions 28 of bolts 17 and 18 are adapted to receive the cylindrical shank portion 31 of tool 13. Referring particularly to Figs. 2 and 4 it will be noted that the slotted recesses in clamping element 16 present vertically aligned arcuate midportions 32 which form a series of bearing surfaces for tool shank 31 when positioned through eyebolts 17 and 18, and upon tightening nuts 27 the eyebolts are drawn toward the bar and press the tool shank against these bearing surfaces to thereby maintain the tool in axially fixed position.

The arcuate slot 25 in the lower portion of clamping element 15 provides means for readily adjusting the lateral tilt of tool 13. By merely loosening the nut 27 on bolt 18 and tapping the side of the depending tool shank, tool 13 (and clamping element 16) may be pivoted about the longitudinal pivot axis of the upper bolt 17 to thereby achieve any desired lateral tilt of the tool within the limits of the arcuate slot. And in this respect it should be understood that it is immaterial to the functioning of the clamping device whether the arcuate slot be formed in the upper or lower projecting end portion of element 15. Furthermore, it should be apparent that the clamping device may be turned 180° with respect to the bar and still serve effectively to position a ground working tool thereon for selective adjustment affording a change in depth of soil penetration, lateral tilt and/or lateral position of the tool along bar 12.

Figures 6, 7:
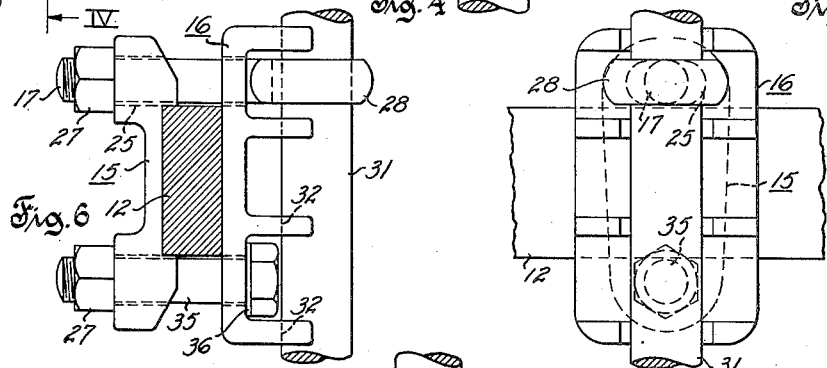
Fig. 6 is a view similar to Fig. 4 showing a modified form of the invention.
Fig. 7 is a right hand elevation of the structure shown in Fig. 6.

Another form of clamping device illustrating the present invention is shown in Figs. 6 and 7 wherein the device just described is modified somewhat by replacing the lower eyebolt with any conventional type bolt, such as the hexagonal head bolt 35 shown. Also, clamping element 15 has been rotated in a vertical plane so that the arcuate slot 25 is at the top of the clamping device. With this arrangement of parts the lower bolt 35, which has a washer element 36 positioned thereon between the head of the bolt and the outer adjacent surface of clamping element 16, affords the pivot axis for angular movement of the tool. And by loosening nut 27 on eyebolt 17 the clamping device and tool may be adjusted to selectively change the position of the tool along bar 12, shift the tool shank 31 vertically with respect to the bar, or change the lateral tilt of the tool relative to the ground. Of course, in this arrangement the arcuate slot may be formed in the lower portion of the rear clamping element 16, if desired, but this offers the disadvantage of requiring the loosening of two bolts for any adjustment other than lateral tilt of the tool. It will also be obvious that in the single eyebolt type of clamp it is immaterial as to whether the eyebolt is placed through the upper or lower projecting end portions of the clamping elements as long as the arcuate slot is correctly positioned relative thereto.

Figure 8:
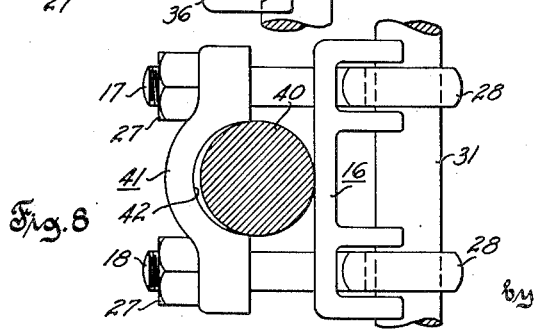
Fig. 8 is another modification of the present invention.

It has also been found that the present invention can be applied to tool clamps for use on supporting bars having a cross sectional shape other than rectangular. Fig. 8 illustrates such a device for use on a cylindrical tool bar 40 wherein the forward clamping element 41 comprises an intermediate portion 42 presenting a generally semicylindrical surface adapted for engagement with a complementary surface on the tool bar. Preferably the semicylindrical surface of the clamping element has a radius slightly smaller than that of the tool bar and the clamping element 41 is made somewhat resilient so that upon tightening nuts 27 the element is flexed to bear firmly against bar 40 and thereby give a more positive clamping action.

From the foregoing description it is seen that apparatus constructed in accordance with this invention provides a clamping device of simplified structure which contains few parts and is readily adaptable for use on any type tool bar, yet providing means for readily accomplishing any or all of the adjustments necessary to attain a proper working position of the tool. Furthermore, although shown and described in connection with a tool having a cylindrical shank portion it will be obvious that the invention can be readily utilized with tool shanks having a cross sectional shape other than cylindrical. And although shown as applied to agricultural implements, it is to be understood that the present invention may be effectively used in connection with the selectively adjustable positioning of other elements, and that it is not intended to limit the invention to the exact constructions and combinations herein disclosed for purposes of illustration as various modifications thereof within the scope of the appended claims may occur to persons skilled in the art.

It is claimed and desired to secure by Letters Patent:

1. A clamping device for adjustably securing a tool to a bar presenting generally oppositely facing surface portions comprising, a pair of clamping elements engaging said oppositely facing surface portions of said bar and having opposite end portions thereof extending beyond corresponding edges of said oppositely facing surface portions, said elements being adjustably fixed thereon by means of a pair of aligned openings through each of said end portions of said pair of elements and a bolt like element inserted through each pair of said openings, one of said bolts including an end portion adapted for receiving a tool, one of said clamping elements including portions thereof coacting with said bar to prevent a relative turning thereof upon loosening either one of said bolts, and one of said openings being in the form of an arcuate opening concentric with respect to the opening in the opposite end portion of the same clamping element whereby upon loosening of said bolt passing through said arcuate opening the other element of said clamping device may rotate relative to said bar and said one element about an axis afforded by the other of said bolts.

2. In combination, a tool bar presenting generally oppositely facing surface portions, a tool, and a clamping device for adjustably securing said tool on said bar comprising, a pair of clamping elements engaging said oppositely facing surface portions of said bar and having opposite end portions thereof extending beyond corresponding edges of said surface portions, said clamping elements being adjustably fixed on said bar by means of a pair of aligned openings through each complementary pair of said end portions and a bolt like element inserted through each pair of said openings, means on one of said bolts receiving said tool, one of said clamping elements including a portion thereof coacting with said one bolt to detachably fix said tool in selective position relative to said one element, the other of said clamping elements including portions thereof coacting with said bar to prevent a relativ turning thereof upon loosening one of said bolts, and one of said openings being in the form of an arcuate slot concentric with respect to the opening in the opposite end portion of the same clamping element whereby upon loosening of said bolt passing through said arcuate opening said one element may be rotated relative to said bar and said other element about an axis afforded by said other bolt.

3. In combination, a tool bar presenting generally oppositely facing surface portions, a ground working tool, and a clamping device for adjustably securing said tool on said bar comprising, a pair of clamping elements engaging said oppositely facing surface portions of said bar and having opposite end portions thereof extending beyond corresponding edges of said surface portions, said clamping elements being adjustably fixed on said bar by means of a pair of aligned openings through each complementary pair of said end portions and a bolt like element inserted through each pair of said openings, means on a corresponding end portion of each of said bolts receiving said tool, one of said clamping elements including portions thereof coacting with said tool receiving means to detachably fix said tool in selective position relative to said one clamping element, the other of said clamping elements including portions thereof coacting with said bar to prevent a relative turning thereof opon loosening one of said bolts, and one of said openings being in the form of an arcuate slot concentric with respect to the opening in the opposite end portion of the same clamping element whereby upon loosening of said bolt passing through said arcuate opening said one clamping element may be rotated relative to said bar and said other element about an axis afforded by said other bolt.

4. A clamping device for adjustably securing a ground working tool to a supporting bar generally rectangular in cross section comprising, a pair of clamping elements engaging oppositely facing sides of said bar and having end portions thereof projecting beyond corresponding edges of said sides, said clamping elements being adjustably fixed on said bar by means including an eyebolt inserted through aligned openings in each complementary pair of said end portions with the openings in said eyebolts adapted for alignment with each other to receive a ground working tool therethrough, one of said clamping elements including portions thereof adapted for coaction with said eyebolts to detachably fix said tool in selected position relative thereto, the other of said clamping elements including portions coacting with said bar to prevent a relative turning between said other clamping element and said bar upon loosening either one of said bolts, and one of said openings in said other clamping element being arcuately slotted in concentric relation with the opening in the opposite end portion of said other clamping element whereby upon loosening said one bolt passing through said slotted opening said one clamping element may be rotated relative to said other clamping element about an axis afforded by said other bolt.

5. In combination with a mobile tool carrying rig having a tool supporting bar generally circular in cross section, a tool clamping means comprising a pair of elements engaging oppositely facing sides of said bar and having opposite end portions thereof projecting above and below said bar with aligned openings through each complementary pair of said end portions, an eyebolt through each pair of said aligned openings adjustably securing said elements on said bar, said eyebolts having their openings in general vertical alignment, a tool having a shank portion thereof positioned through both of said eyebolt openings in bearing relation with the adjacent one of said clamping elements, the other of said clamping elements including portions coacting with said bar to prevent a relative turning between said other clamping element and said bar upon loosening either one of said bolts, and one of said openings in said projecting end portions being arcuate in concentric relation with the opening in the opposite end portion of the same element whereby upon loosening the bolt passing through said arcuate opening said one clamping element engaging said tool may be rotated relative to said other element and bar about an axis afforded by said other bolt.

6. A clamping device for adjustably securing a tool to a bar presenting generally oppositely facing surface portions comprising, a pair of clamping elements engaging said oppositely facing surface portions of said bar and having opposite end portions thereof extending beyond corresponding edges of said oppositely facing surface portions, said elements being adjustably fixed thereon by means of a pair of aligned openings through each of said end portions of said pair of elements and a bolt like element inserted through each pair of said openings, one of said bolts including an end portion adapted for receiving a tool, one of said clamping elements including portions thereof coacting with said bar to prevent a relative turning thereof upon loosening either one of said bolts, one of said openings in said one element being in the form of an arcuate opening concentric with respect to the other opening in the opposite end portion of said one element, said other opening being substantially the same diameter as the bolt positioned therethrough.

WALTER G. CHARLEY.

References Cited in the file of this patent
UNITED STATES PATENTS

| Number | Name | Date |
|---|---|---|
| Re. 8,926 | Dodge | Oct. 14, 1879 |
| 538,054 | Traphagen | Apr. 23, 1895 |
| 602,430 | Corcoran | Apr. 19, 1898 |
| 660,969 | Renfrow | Oct. 30, 1900 |
| 669,165 | Hartzell | Mar. 5, 1901 |
| 863,024 | Courtright | Aug. 13, 1907 |
| 1,982,862 | Erdman | Dec. 4, 1934 |